March 11, 1952

L. M. LARKIN 2,589,099

VENDING MACHINE

Filed May 14, 1947

Inventor
Lincoln M. Larkin
By Spencer, Marzall, Johnston & Cook,
Attys.

March 11, 1952 L. M. LARKIN 2,589,099
VENDING MACHINE
Filed May 14, 1947 5 Sheets-Sheet 2
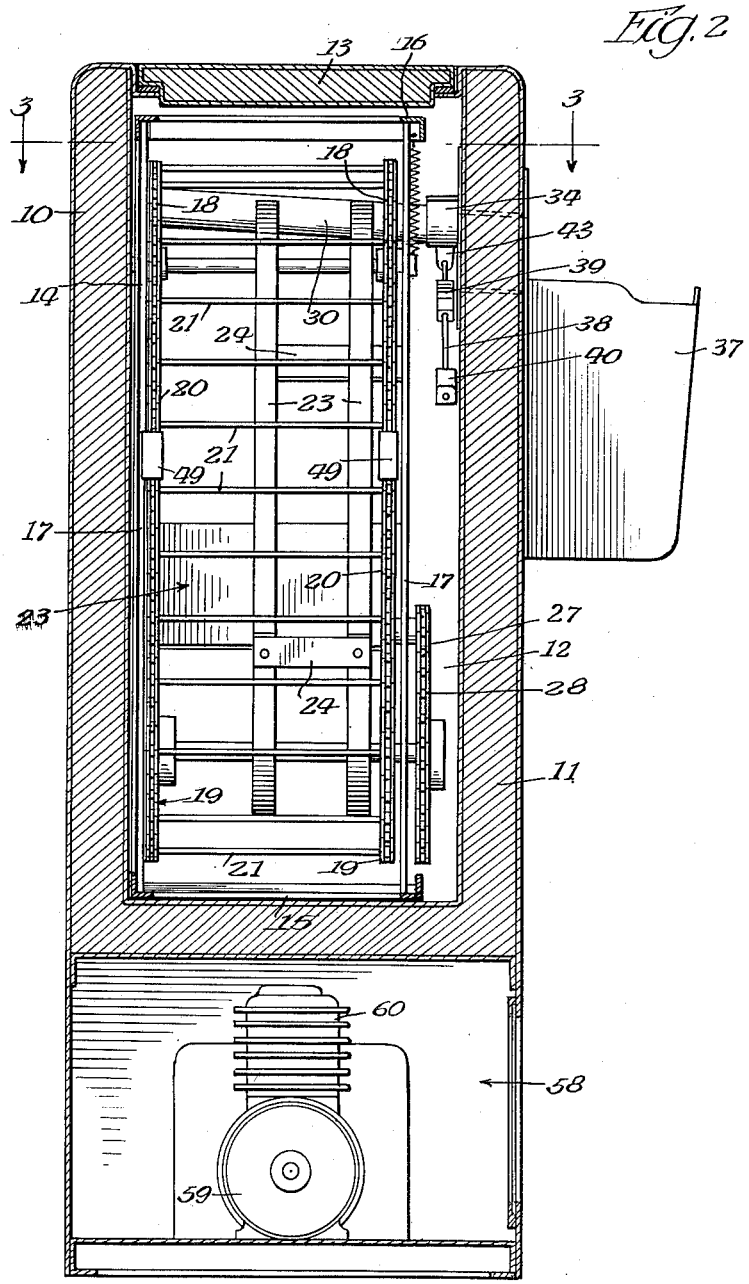
Inventor
Lincoln M. Larkin
By Spencer, Marzall, Johnston & Cook,
attys March 11, 1952 L. M. LARKIN 2,589,099
VENDING MACHINE
Filed May 14, 1947 5 Sheets-Sheet 3
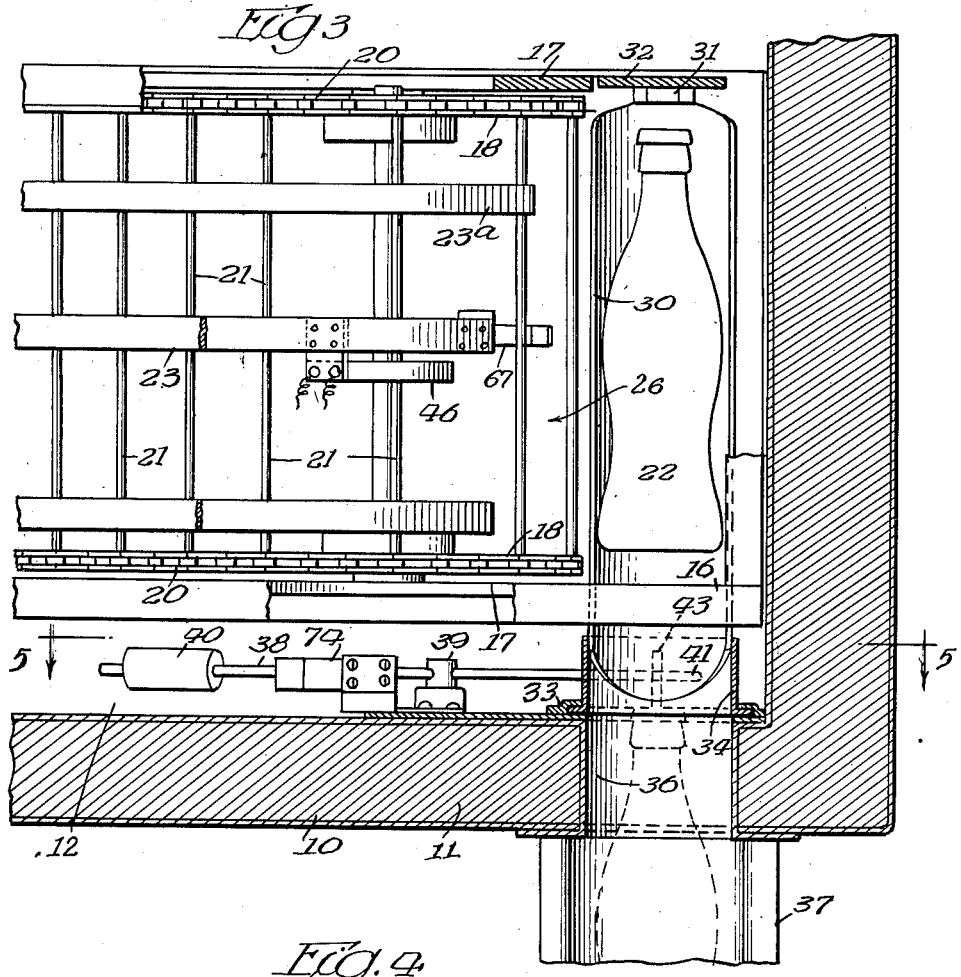
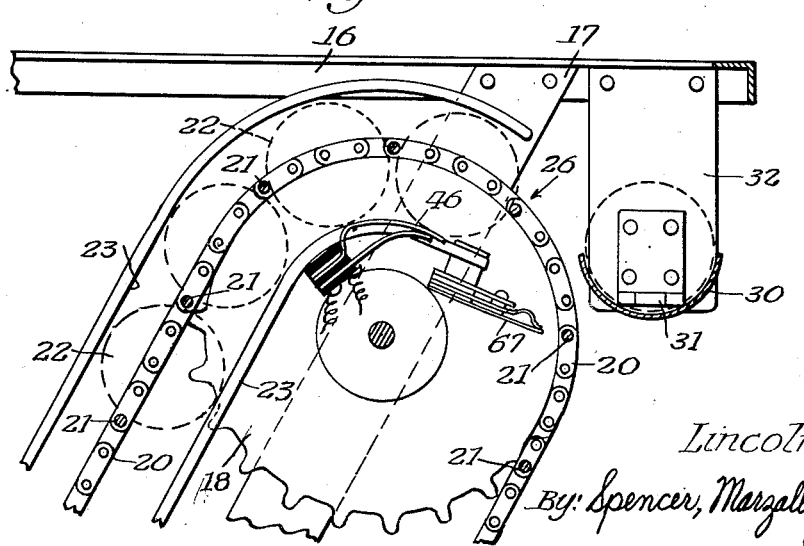
Inventor
Lincoln M. Larkin
By: Spencer, Marzall, Johnston & Cook
attys March 11, 1952 L. M. LARKIN 2,589,099
VENDING MACHINE
Filed May 14, 1947 5 Sheets-Sheet 4
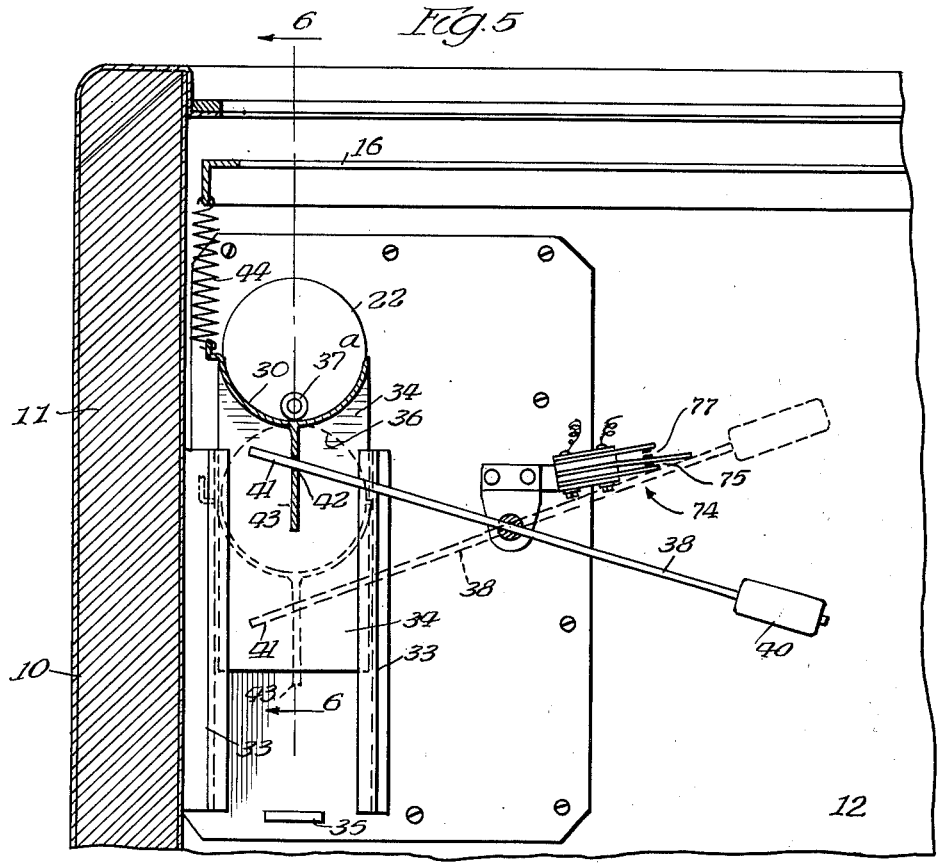
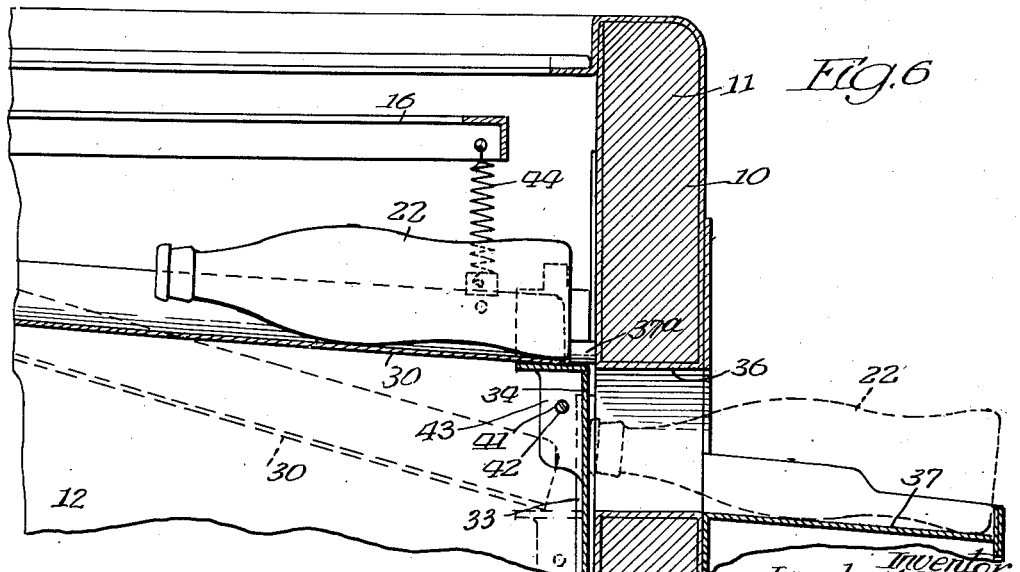
Inventor
Lincoln M. Larkin
By: Spencer, Margall, Johnston, Cook Attys Patented Mar. 11, 1952

2,589,099

UNITED STATES PATENT OFFICE 2,589,099

VENDING MACHINE

Lincoln M. Larkin, Libertyville, Ill., assignor to Linklark, Inc., Chicago, Ill., a corporation of Illinois Application May 14, 1947, Serial No. 748,016

6 Claims. (Cl. 194—10)

This invention relates to improvements in vending machines, particularly adapted, though not necessarily limited in use, for vending bottled goods, such as beverages and the like, and one of the objects of the invention is to provide an improved machine of this character, which will successively deliver the articles, upon proper operation of the machine.

Another object is to provide an improved machine of this character, embodying an endless conveyor for the articles, which, when in operation to deliver the articles, will be given a step-by-step movement, by means of electrically controlled mechanism provided for that purpose, and which conveyor has a constant direction of travel when the machine is properly loaded to deliver the articles.

A further object is to provide improved means whereby, when the machine is empty, the conveyor may be given a reverse direction of travel, to facilitate conditioning or loading the machine for future delivery of articles.

A further object is to provide in a machine of this character, improved means whereby the conveyor and its operating mechanism may be bodily removed, as a unit, from the enclosing casing or housing.

A further object is to provide in a machine of this character, improved means whereby a supply of articles other than those that are being dispensed, may be stored, and improved means for maintaining all of the articles within the housing or casing at a low temperature.

A still further object is to provide improved means for controlling the operation of the conveyor and also its direction of travel, the direction of travel of the conveyor being reversed when loading the machine.

Still another object is to provide an improved machine of this character, which will be simple and compact in construction, and effective and efficient in operation.

To the attainment of these ends, and the accomplishment of other new and useful objects as will appear, the invention consists in the features of novelty in substantially the construction, combination and arrangement of the several parts, hereinafter more fully described and claimed, and shown in the accompanying drawings exemplifying this invention, in which Fig. 1 is a vertical sectional view of a vending machine of this character, embodying this invention, with parts omitted.

Fig. 2 is a vertical sectional view taken on line 2—2, Fig. 1, with parts omitted.

Fig. 3 is a detail horizontal sectional view on line 3—3, Fig. 2, on an enlarged scale, and with parts omitted.

Fig. 4 is a detail vertical sectional view, on an enlarged scale, showing the upper part of the conveyor mechanism.

Fig. 5 is an enlarged detail sectional view taken on line 5—5, Fig. 3.

Fig. 6 is a detail sectional view taken on line 6—6, Fig. 5.

Figure 1:
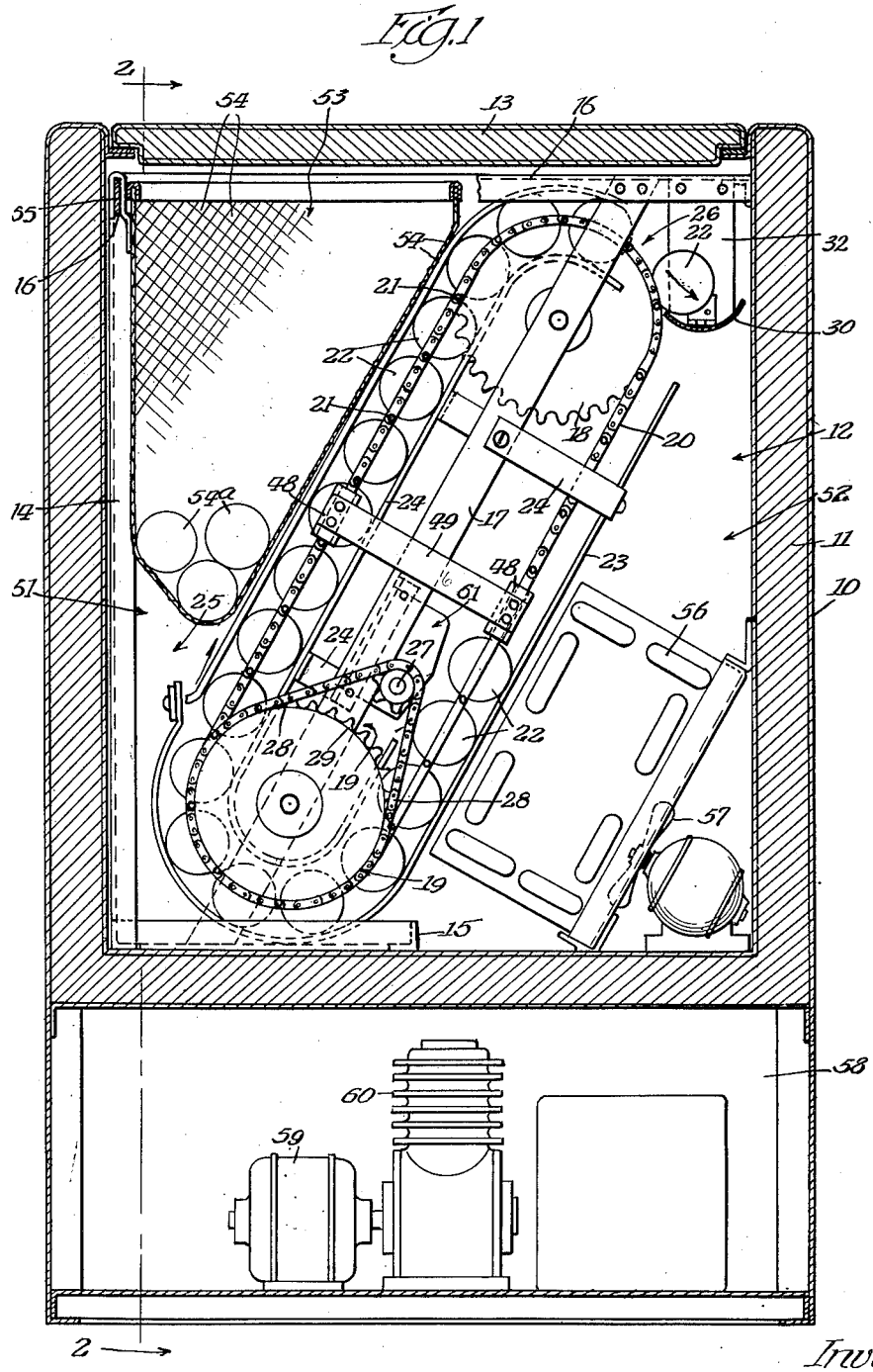
Figure 7:
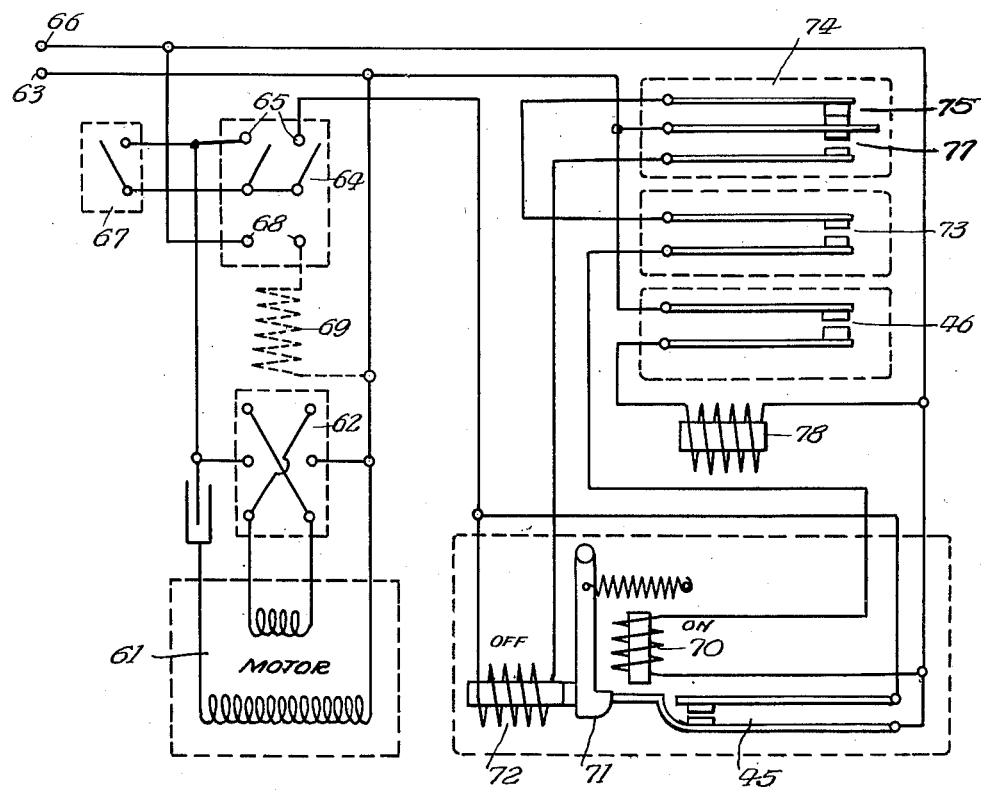
Fig. 7 is a wiring diagram.

Referring more particularly to the drawings, the numeral 10 designates a housing or casing of any desired size and configuration, and constructed of any suitable material, the walls of which are formed of suitable insulating material 11. The housing is provided with a chamber 12, which is preferably open at the top, and is also provided with a closure 13, suitably secured in position with respect to the chamber.

Within the chamber is arranged a suitable supporting frame or structure embodying uprights 14, base members 15, and top members 16, secured together in any suitable manner, preferably so that the base members 15 will rest upon the bottom of the chamber 13, with the uprights 14 preferably adjacent one side wall of the chamber, and the top members 16 adjacent the open top of the chamber. Mounted upon this frame structure, and so as to be in an inclined position in the chamber, is a supplemental frame structure embodying inclined uprights or side members 17, one end of which is secured to the top members 16, the lower ends thereof being secured to the bottom or base members 15.

Journaled adjacent the top of the frame structure thus formed, are laterally spaced sprocket wheels 18, and similar sprocket wheels 19 are journaled adjacent the bottom of the frame structure. Endless flexible members or sprocket chains 20 pass over the respective cooperating pairs of sprocket wheels, and these members are spaced laterally from each other, to accommodate therebetween the articles to be delivered.

Connecting bars or flights 21 are disposed between and connect said endless members, and are spaced from each other in directions lengthwise of the endless members, and between which bars the articles 22 that are to be dispensed, are disposed, to be advanced thereby when motion is imparted to the conveyors or flexible members. Supports 23 for the articles are arranged along their path of travel, and such supports are held in position in any suitable manner, such as by means of brackets or supporting members 24, which in turn may be mounted upon the frame member 17. The supports 23 terminate at a loading and discharge station 26, where articles 22 may be loaded into the conveyor and also delivered from the conveyor, to be dispensed to the customer.

A motor driven sprocket wheel 27 is provided to impart motion to the conveyor, and over this sprocket passes an endless chain or belt 28, which also passes over a sprocket or pulley 29, that is connected to one of the sprocket wheels 19.

Adjacent the station 26, through which the articles are delivered from the conveyor, there is provided a trough-like receiver 30, which is preferably supported, at one end, by means of a hinge 31, connected to a bracket 32 supported by the frame member 16. This receiver extends transversely of the conveyor, the forward end being guided by means of a slide 34, which moves in guides 33, and upon which slide one end of the receiver 30 rests (Fig. 6), a stop 35 being provided to limit the downward movement of the slide.

In the wall of the casing or housing 10, there is provided an opening 36, with respect to which the end of the receiver 30 is adapted to be positioned, so that when an article is delivered to the receiver, the end of the latter will be depressed, as will also the slide 34, and the receiver will form a chute, so that the article will slide down the receiver through the opening 36, and onto a support 37 adjacent the opening 36, to the customer. The slide 34 is so constructed that it will serve as a closure for the opening 36. Arranged adjacent the opening is a stop device 37a, to arrest the movement of the slide 34 in one direction. This stop may also be of a size to serve as a bumper or cushion for the article in its movement upon the receiver.

Any suitable means may be provided for returning the slide 34, after the article has been delivered therefrom through the opening 36. A suitable and efficient means embodies a lever 38, pivotally supported intermediate its ends, as at 39. One end of this lever is weighted, as at 40, and the other end 41 passes through an opening 42 in a web or flange 43 on the slide 34. If desired, a spring 44 may be provided to raise the end of the receiver 30.

When an article 22 is delivered from the conveyor onto the receiver 30, the operation of the conveyor is stopped, in a manner to be set forth; and in order to control such operation, a make and break device 74, preferably a single pole, double throw switch (Fig. 5), is provided, which controls the operation of the motor that rotates the sprocket wheel 27, and by means of which the conveyor is operated.

In order to stop the operation of the conveyor when the machine becomes empty, i. e., when the last article 22 has been delivered from the conveyor to the receiver 30, a make and break device 46 (Fig. 4) is provided in the path of movement of the articles on the conveyor, and preferably adjacent the station 26 where the articles are delivered from the conveyor to the receiver 30. This make and break device also controls the operation of the motor driven sprocket 27.

When there are articles on the conveyor, they will maintain the make and break device 46 closed, so that the motor will operate the sprocket 27, but when no articles are on the conveyor, the make and break device 46 will automatically open, and the circuit to the motor will be broken, with the result that movement of the conveyor will stop. The circuit to the motor will also be interrupted through the operation of a make and break device or switch 45, the operation of which is controlled, in response to movement of the lever 38, by switch and solenoid means, hereinafter more fully described and including a make and break device 74, which is actuated by movement of the lever, so that when articles, to be dispensed, are on the conveyor, the mechanism will be conditioned for operation, and intermittent steps of advancement will be imparted to the conveyor, until the last article on the conveyor is dispensed, at which time the make and break device 46 will open, to stop the motor. With this construction, it will not be possible to operate the conveyor when there are no articles thereon to be dispensed.

In order to re-load the machine, the direction of travel of the conveyor is reversed, by reversing the direction of rotation of the motor that controls the rotation of the sprocket wheel 27, and for that purpose there is provided a reversing switch 62, suitably located so as to be actuated by the operator.

Thus it will be seen that the conveyor may be intermittently actuated to deliver the articles. When there are articles on the conveyor, this operation may be continued; when there are no articles on the conveyor to be delivered, the operation of the conveyor will be automatically stopped, and when it is desired to re-load the conveyor, the direction of travel thereof may be reversed. All of these steps of operation are controlled by a single motor, with various make and break devices for controlling the operation of the motor.

The conveyor is guided in its travel by means of suitable guides 48, supported by brackets 49, which in turn are mounted upon the supporting frame structure. Since the conveyor is mounted upon the supporting frame structure, as well as the conveyor driving motor, and the receiver 30, all of these parts may be readily removed from the casing or housing 10 as an assembled unitary structure, and may be as readily replaced.

The conveyor and its immediate supporting structure are arranged in an inclined position within the housing or casing 10, so as to provide a space 51 on one side of the conveyor, and a similar space 52 on the other side of the conveyor. Within the space 51 is arranged a suitably shaped container 53, the walls of which are provided with openings 54. The container is adapted to be removably supported in such space, in any suitable manner, such as by being provided with hook-shaped portions 55, adapted to removably engage over the top member 16 of the removable supporting frame structure. This container is adapted to be removed either by itself or with the said frame structure.

Within the container 53, an additional supply of articles 54a may be stored for future use. Within the space 52, is arranged a heat exchanger 56, of any desired or suitable construction, and which may be removably held in position in any suitable manner. Associated with the heat exchanger is a fan or other air circulation creating device 57, suitably operated, so as to direct a blast of cold air against the articles on the conveyor, and also through the openings 54 in the container 53, against the articles therein.

Within the casing or housing 10, and below the chamber in which the conveyor and heat exchanger are located, is a compartment 58, in which is arranged a motor 59, and a compressor 60, which compressor is operatively connected with the heat exchanger 56, for circulating a cooling medium through the heat exchanger.

The electrical system for operating the dispensing apparatus consists of a motor 61 for driving the sprocket 27 to operate the merchandise carrier 20—21 in either direction, and the reversing switch 62 which, in one position, conditions the motor 61 to turn in one direction when energized, said switch, in its other position, conditioning the motor for reverse driving movement. The motor 61 and switch 62, on one side, are connected directly to a conductor 63 of the power supply line.

The electrical system also may include a double pole, double throw switch 64 having blades electrically connected together. This has two pairs of stationary contacts 65 and 68. One contact of one pair 65 of the stationary contacts is connected with the line remote sides of the motor 61, and switch 62. The other contact of said pair 65 is connected to the power conductor 66, through the normally open control switch 45. When the inter-connected blades of switch 64 are moved into position engaging said contact pair 65, this being the forward driving position, the motor will be connected in series with the switch 45, between the power conductors 63—66, and accordingly, the motor will operate under the control of said switch 45, in a direction determined by the position of the switch 62. In this connection, it is contemplated that the switch 62 will be in position conditioning the motor for forward driving movement, when the switch 64 is in position engaging the said forward driving contact pair 65.

The electrically connected movable blades of the switch 64 are also electrically connected with one side of a reverse loading switch 67, of the normally open push-button type. The other side of this switch 67 is connected with the line remote sides of the motor 61, and switch 62.

One of the contacts of the remaining or reverse driving stationary contact pair 68, of the switch 64, is connected to the line conductor 66, so that when the blades of switch 64 are in position engaging said other or reverse driving contacts 68, the motor 61 and switch 62 will be connected with the power supply line in series with the reverse loading switch 67.

If desired, the switch 62 may be of the manually operable type, in which case it will be necessary to move it to the reverse position or to the forward driving position at the same time the switch 64 is operated. To this end, the switches 62 and 64 may be mechanically interconnected for operation in unison. However, if desired, the reversing switch 62 may be normally biased, as by means of a suitable spring, toward forward motor driving position, and solenoid operating means 69 may be provided for throwing the switch 62 to motor reversing position, against the influence of its biasing spring. The solenoid 69 may be interconnected between the power conductor 63 and one of the reversing contacts of the switch 64, so that said solenoid will be energized whenever and so long as the switch 64 is in the reversing position.

It will be seen that both the switch 67 and the solenoid 69, if employed, are rendered inactive whenever the switch 64 is in the forward driving position. When the switch 64 is in reverse driving position, however, the motor may be operated to drive the merchandise carrier 20—21 in the reverse direction, under the control of the pushbutton switch 67, to thereby allow the carrier to be loaded.

The switch 45 is of the normally open type. It may be operated to close by a switch closing solenoid 70, and is provided with a spring biased holding latch 71 which, after closure of the switch 45 by operation of the solenoid 70, will retain the switch 45 in closed position until the latch is retracted and released by operation of a latch releasing solenoid 72.

Accordingly, after the apparatus has been loaded with merchandise, by operation of the motor 61 in the reverse or loading direction under control of the switches 67, 64 and 62, the switch 64 may be moved to the forward motor driving or dispensing position, in which position the motor may be operated for dispensation of merchandise, by closure of the switch 45.

To control the operation of switch 45, the equipment includes the normally open empty switch 46, which is held closed so long as any merchandise remains in the apparatus for dispensation; a normally open coin switch 73, which is closed momentarily as a result of the deposit of a coin in the coin mechanism; the single-pole double-throw switch 74, having normally closed contacts 75, and normally open contacts 77, which switch operates to open the normally closed contacts 75, and close the normally open contacts 77, as an item of merchandise is delivered upon the discharge tray 30. The contacts 75 remain open and the contacts 77 closed so long as merchandise remains on the dispensing tray, and are restored to normal position by removal of said merchandise from the tray.

The equipment also includes a safety coin return device 78 disposed in the coin mechanism and operative normally to deflect and return coins to the depositor in the event that the apparatus is empty of merchandise, or if there is a failure of operating power on the supply lines 63—66, said safety device being in series with the empty switch 46 between the power supply lines. As long as the empty switch 46 is closed by merchandise in the apparatus, the device 78 will be energized, and will accept deposited coins. In the event of power failure on the supply lines 63—66, or when the empty switch 46 opens, as when there is no more merchandise in the apparatus for dispensation, the safety device 78, being de-energized, operates to return all coins that may be deposited while such empty or power failure conditions prevail.

The coin switch 73 is connected in a series circuit between the power supply conductors 63—66, said circuit including, in addition to the switch 73, the normally closed switch 75 and the switch closing solenoid 70. Accordingly, upon deposition of a coin, the safety device 78 being energized, the coin will be delivered past the switch 73, and will close the same momentarily to thereby momentarily energize the solenoid 70, thus closing the switch 45, which thereafter is held in closed position by the holding latch 71. Closure of the switch 45 will operate the motor 61 to advance the merchandise carrier 20—21 and deliver a merchandise unit onto the delivery tray 30, thereby closing the switch 77 and opening switch 75.

The switch 77 is interconnected in a circuit between the power supply conductors 63—66, which circuit, in addition to the switch 77, includes the switch 45 and the latch releasing solenoid 72. Accordingly, upon closure of the switch 77 by delivery of merchandise on the dispensing tray, the switch 45 at such time being closed, the solenoid 72 will be energized to release the latch 71 and allow the switch 45 to open. Upon the opening of the switch 45, in such fashion, the motor circuit, and also the energizing circuit of the solenoid 72, will be broken, to thereby stop the dispensing operation, with the switch 45 in open position. As soon as the discharged merchandise is removed from the dispensing tray 30, the switch 77 will open and the switch 75 will reclose, thus restoring the apparatus to stand-by condition ready for a repeat performance.

While the preferred form of the invention has been herein shown and described, it is to be understood that various changes may be made in the details of construction, and in the combination and arrangement of the several parts, within the scope of the claims, without departing from the spirit of this invention.

What is claimed as new is:

1. An article dispensing machine comprising front, rear, bottom, and end walls forming a rectangular, open top chamber of relatively shallow depth from front to rear, a cover normally closing the open top of said chamber, a frame in said chamber, an endless inclined article conveyor disposed diagonally in said chamber and comprising a pair of spaced apart, coaxially alined wheel sets journalled on said frame and located respectively in a lower and in a diagonally opposite upper corner of the chamber, at opposite ends thereof, the axes of said wheel sets extending transversely of said chamber and corresponding wheels of said sets lying in common planes substantially parallel with, and spaced inwardly of, said front and rear walls, an endless flexible traction member on the corresponding wheels of the sets, article carrying members on and extending between said traction members, conveyor actuating means for traveling said traction members on and around said wheels to deliver said article carrying members successively in article discharging position, in said conveyor, and then to discharge articles, from such carrying members in discharging position, to dispensing position at a delivery station in the top of the chamber at one end thereof, an open top foraminous article storage hopper removably supported within and substantially filling the space in said chamber, above said inclined conveyor, said hopper being accessible through the open top of the chamber when said cover is open, and cooling means in said chamber beneath the conveyor and operable to circulate a coolant fluid through the conveyor and any articles therein and thence upon articles in said hopper, said conveyor being in the path of the coolant fluid intermediate the circulating means and the foraminous hopper.

2. An article dispensing machine comprising walls forming a rectangular, open top chamber of relatively shallow depth from front to rear, a cover normally closing the open top of said chamber, a frame in said chamber, an inclined article conveyor comprising endless flexible traction means supported on said frame diagonally in said chamber, with opposed ends of said conveyor disposed respectively in a lower and in a diagonally opposite upper corner of the chamber at opposite ends thereof, said endless flexible traction means being supported on guide means on the frame at the opposite ends of the conveyor, and article carrying members at intervals in said traction means, conveyor actuating means for traveling said traction members on and around said guide means to deliver said article carrying members successively in article discharging position, in said conveyor, and then to discharge articles, from such carrying members in discharging position, to dispensing position at a delivery station in the top of the chamber at one end thereof, an open top foraminous article storage hopper removably supported within and substantially filling the space in said chamber, above said inclined conveyor, said hopper being accessible through the open top of the chamber when said cover is open, and cooling means in said chamber beneath the conveyor and operable to circulate a coolant fluid through the conveyor and any articles therein and thence upon articles in said hopper, said conveyor being in the path of the coolant fluid intermediate the circulating means and the foraminous hopper.

3. An article dispensing machine comprising insulated walls forming a rectangular, open top chamber of relatively shallow depth from front to rear, a cover normally closing the open top of said chamber, a frame in said chamber, an inclined article conveyor supported on said frame diagonally in said chamber, with opposed ends of said conveyor disposed respectively in a lower and in a diagonally opposite upper corner of the chamber at opposite ends thereof, said conveyor comprising carrying means operable to deliver articles thereon successively in article discharging position, and then to discharge articles, from such carrying means in discharging position, to dispensing position at a delivery station in the chamber at the upper end of the conveyor, an open top foraminous article storage hopper removably supported within and substantially filling the space in said chamber, above said inclined conveyor, said hopper being accessible through the open top of the chamber when said cover is open, and cooling means comprising a heat exchanger in said chamber beneath said inclined conveyor, a fan for circulating air in said chamber successively past said exchanger and thence through said inclined conveyor and upon said foraminous hopper, and means to circulate a cooling medium through said exchanger from a source outwardly of said chamber, said conveyor being in the path of the coolant fluid intermediate the circulating means and the foraminous hopper.

4. An article dispensing machine comprising walls forming a rectangular, open top chamber of relatively shallow depth from front to rear, a cover normally closing the open top of said chamber, a mounting frame of generally rectangular configuration sized to fit snugly within said chamber, an inclined article conveyor supported on said frame diagonally in said chamber, with opposed ends of said conveyor disposed respectively in a lower and in a diagonally opposite upper corner of the chamber at opposite ends thereof, said conveyor comprising carrying means operable to deliver articles thereon successively in article discharging position, and then to discharge articles, from such carrying means in discharging position, to dispensing position at a delivery station in the chamber at the upper end of the conveyor, an open top foraminous article storage hopper removably supported, on said frame, within and substantially filling the space in said chamber, above said inclined conveyor, said hopper being accessible through the open top of the chamber when said cover is open, and cooling means disposed in said chamber, beneath said conveyor, said mounting frame being removable from said chamber through the open top of the chamber as a unit together with said conveyor, said conveyor being in the path of the coolant fluid intermediate the circulating means and the foraminous hopper.

5. An article dispensing machine comprising means forming a storage chamber, an endless article conveyor mounted in the chamber and operable to deliver articles thereon successively in article discharging position, and then to discharge articles therefrom into dispensing position at a delivery station in the chamber, an article receiver tiltably mounted in said chamber at said delivery station and normally biased in position to receive articles discharged from the conveyor, a delivery opening in the wall of said chamber opposite said receiver, a closure member for said opening, mounted on the chamber wall and normally biased to close said opening, said closure member underlying said receiver and being depressible thereby under the influence of the weight of an article on said receiver, to uncover said opening and to discharge the article therethrough from said receiver by gravity, a normally inactive relay switch operable to cause dispensing movement of the conveyor, a coin actuated switch for operating the relay switch to cause conveyor movement, latch means to hold the relay switch in conveyor driving position, latch release means for releasing said latch means and dispensing switch means drivingly connected with said receiver and operable thereby, said dispensing switch means comprising a release switch operable to actuate said releasing means and a circuit conditioning switch connected in circuit with said coin actuated switch to disable the same, in response to delivery of an article on said receiver.

6. An article dispensing machine comprising means forming a storage chamber, an endless article conveyor mounted in the chamber and operable to deliver articles thereon successively in article discharging position, and then to discharge articles therefrom into dispensing position at a delivery station in the chamber, an electric motor and associated selectively operable switch means for controlling the motor to drive the conveyor forwardly in one direction to deliver articles successively at the delivery station, and to drive the conveyor in the reverse direction to allow the same to be loaded with dispensable articles, including a loading switch for controlling conveyor movement in the reverse or loading direction, and a normally inactive relay switch for controlling forward or dispensing movement of the conveyor, a coin actuated switch operable to condition the relay switch for conveyor movement in position causing conveyor movement, selectively operable coin accepting and rejecting means including an empty switch disposed in position to be actuated by articles in discharging position to thereby cause acceptance of coins and delivery thereof in position to operate the coin actuated switch, and to reject coins in the absence of an article in discharging position on the conveyor, latch means to hold the relay switch in conveyor driving position, latch releasing means operable to release said latch means, dispensing switch means comprising a latch release switch operable to actuate releasing means and a conditioning switch connected in circuit with said coin actuated switch and operable to disable the same, said release and conditioning switches being operable in response to delivery of an article from the conveyor into dispensing position at said delivery station.

LINCOLN M. LARKIN.

REFERENCES CITED

The following references are of record in the file of this patent:

UNITED STATES PATENTS

| Number | Name | Date |
| --- | --- | --- |
| 1,260,578 | Ravert | Mar. 26, 1918 |
| 1,890,753 | Scheurer | Dec. 13, 1932 |
| 2,189,740 | Mills | Feb. 6, 1940 |
| 2,272,750 | Miller | Feb. 10, 1942 |
| 2,280,323 | Tone | Apr. 21, 1942 |
| 2,290,275 | Childers | July 21, 1942 |
| 2,359,182 | Wilsey | Sept. 26, 1944 |
| 2,435,177 | Connell et al. | June 27, 1948 |